United States Patent
Maack et al.

(10) Patent No.: US 9,805,467 B2
(45) Date of Patent: Oct. 31, 2017

(54) LUNG MEASUREMENTS

(71) Applicant: KONINKLIJKE PHILIPS N.V., Eindhoven (NL)

(72) Inventors: Hanns-Ingo Maack, Norderstedt (DE); Andre Goossen, Radbruch (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/898,371

(22) PCT Filed: Jun. 19, 2014

(86) PCT No.: PCT/EP2014/062908
§ 371 (c)(1),
(2) Date: Dec. 14, 2015

(87) PCT Pub. No.: WO2014/202705
PCT Pub. Date: Dec. 24, 2014

(65) Prior Publication Data
US 2016/0210739 A1    Jul. 21, 2016

(30) Foreign Application Priority Data
Jun. 19, 2013    (EP) .................................... 13172787

(51) Int. Cl.
*G06K 9/00*    (2006.01)
*G06T 7/00*    (2017.01)
(Continued)

(52) U.S. Cl.
CPC ............... *G06T 7/0012* (2013.01); *G06K 9/46* (2013.01); *G06T 7/68* (2017.01);
(Continued)

(58) Field of Classification Search
CPC ................ G06K 9/00; G06T 7/00; A61B 5/00
(Continued)

(56) References Cited

U.S. PATENT DOCUMENTS 4,538,227 A * 8/1985 Toraichi ................. G06T 5/009
378/62
8,577,108 B2 * 11/2013 Huo ..................... G06K 9/4609
382/128

(Continued)

FOREIGN PATENT DOCUMENTS

| WO | 9515536 A1 | 6/1995 |
| WO | 9942031 A1 | 8/1999 |
| WO | 2014054018 A2 | 4/2014 |

OTHER PUBLICATIONS

Armato, et al., "Computerized analysis of abnormal asymmetry in digital chest radiographs: Evaluation of potential utility", Journal of Digital Imaging; The Journal of the Society for Computer Applications in Radiology, Springer-Verlag, NE, vol. 12, No. 1, Feb. 1, 1999. pp. 34-42.

(Continued)

*Primary Examiner* — Abolfazl Tabatabai

(57) ABSTRACT

The present invention relates to lung measurement. In order to provide enhanced information about a patient that facilitates further assessment steps, 2D X-ray image data of a patient's chest is provided, and the image data is segmented to identify lung structures to provide segmented image data separated from un-segmented areas. Further, spatial lung volume information is extracted from the image data using the segmented image data derived from the image data. Still further, lungs symmetry information is determined using the extracted spatial lung volume information. Finally, the lungs symmetry information is provided to a user. For example, a 2D X-ray image data of a patient's chest is provided (84) and a lungs mask image is formed (86) after the step of segmenting the input image data. Then, the lungs mask image is used to define areas, within which a predetermined adaptation is applied (88) to the original 2D X-ray image data producing a thorax mask image. Next, left and right (Continued)

images are provided (90) showing the left and the right spatial lungs volume information of the regions defined originally by the lungs mask image. Finally, based on the spatial lungs volume information, lungs symmetry information or total lung volumes may be calculated and provided (92).

11 Claims, 8 Drawing Sheets

(51) Int. Cl.
*G06K 9/46* (2006.01)
*G06T 7/68* (2017.01)
*A61B 5/08* (2006.01)

(52) U.S. Cl.
CPC ............... *G06T 2207/10116* (2013.01); *G06T 2207/20224* (2013.01); *G06T 2207/30061* (2013.01)

(58) Field of Classification Search
USPC ....... 382/128, 129, 130, 131, 132, 133, 134; 378/46, 62, 92, 101; 600/533, 538
See application file for complete search history.

(56) References Cited

U.S. PATENT DOCUMENTS 9,269,165 B2 * 2/2016 La Pietra ............... G06T 5/001
2009/0196481 A1   8/2009 Li et al.

OTHER PUBLICATIONS

Tsukuda, et al., "Detection of Lung Nodules on Digital Chest Radiographs: Potential Usefulness of a New Contralateral Subtraction Technique", Detection of Lung Nodules on Digital Chest Radiographs, vol. 223, No. 1, pp. 199-203.
Carrascal, et al., "Automatic Calculation of Total Lung Capacity From Automatically Traced Lung Boundaries in Postero-Anterior and Lateral Digital Chest Radiographs", Medical Physics, AIP, Melville, NY, vol. 25, No. 7, Jul. 1, 1998, pp. 1118-1131.
Ginneken, et al., "Computer-Aided Diagnosis in Chest Radiography: A Survey", IEEE Transactions on Medical Imaging, vol. 20. No. 12. Dec. 2001, pp. 1228-1241.
Goossen, et al., "Bone Suppression during x-ray guided percutaneous cardiac interventions" (Found in ID) 2012ID00676.
Kao, Computer Aided Diagnosis in Chest Radiographs.
Li, et al., "Contralateral subtraction: A novel technique for detection of asymmetric abnormalities on digital chest radiographs", Kurt Rossmann Laboratories for Radiologic Image Research, Department of Radiology, The University of Chicago, Chicago, IL, Medical Physics, vol. 27, No. Jan. 2000, pp. 47-55.

* cited by examiner

LUNG MEASUREMENTS

CROSS-REFERENCE TO PRIOR APPLICATIONS

This application is the U.S. National Phase application under 35 U.S.C. §371 of International Application No. PCT/EP2014/062908, filed on Jun. 19, 2014, which claims the benefit of European Patent Application No. 1317278.7, filed on Jun. 19, 2013. These applications are hereby incorporated by reference herein.

FIELD OF THE INVENTION

The present invention relates to lung measurements, and in particular to a method for providing lung symmetry information, to a lung measurement device, to an X-ray image arrangement, to a computer program element, and to a computer-readable medium.

BACKGROUND OF THE INVENTION

Chest X-ray screening, for example, is an important procedure for the detection and monitoring of lung abnormalities and diseases at an early stage in the lungs of patients. Medical personnel, such as doctors or radiologists, may detect abnormalities visually directly from the chest X-ray images. US 2009/0196481 describes a method for processing each of chest X-ray images photographed by an X-ray imaging apparatus by analyzing characteristics of lung images in the chest X-ray images, sorting the chest X-ray images, based on a result of the analysis, and displaying the result of the sorting. "Computer-Aided Diagnosis in Chest Radiographs", National Sun Yat-Sen University, discusses a method of evaluating chest X-ray images using lung symmetry. When making a judgement about the chest radiograph, an opinion about the lung condition may be formed based on the experience of the medical personnel. For example, pulmonary oedema is an example of a disease that commonly affects the appearance of the lungs in chest X-rays and which must be monitored visually by medical personnel. Pulmonary oedema is fluid accumulation in the air spaces of the lungs. Another example is pneumonia, an inflammatory condition of the lung. In both cases, a chest X-ray image is taken, for example before symptoms are seen in order to exclude that the patients are sick. The X-ay images may then be scrutinized by a medical professional, and identification of the disease is reliant on the skill of that professional. However, interpreting information provided by the image is a challenging task and not all information is directly visible.

An article by Armato et al. "Chest Radiographs: Evaluation of Potential Utility", Journal of Digital Imaging, Vol. 12 No. 1, February 1999, pp. 34-42, describes a method for the fully automated analysis of abnormal asymmetry in digital posteroanterior (PA) chest radiographs. An automated lung segmentation method is used to identify the aereated lung regions in chest radiographs. The relative areas of segmented right and left lung regions in each image are compared with the corresponding area distributions of normal images to determine the presence of abnormal asymmetry.

U.S. Pat. No. 4,538,227 describes a method for extracting volume information for a part of a living body from an X-ray projection image. The boundary and centroid of the part are obtained from the optimal ternary data using the variance of the gray-level of the image and the separation degree of a histogram. The volume, as well as a three-dimensional view of the part, is obtained from this data using a grey-level method.

SUMMARY OF THE INVENTION

There may be a need to provide enhanced information about a patient that facilitates further assessment steps.

The object of the present invention is solved by the subject-matter of the independent claims, wherein further embodiments are incorporated in the dependent claims. It should be noted that the following described aspects of the invention apply also for the method for providing lungs symmetry information, the lungs measurement device, the X-ray imaging arrangement, the computer program element, and the computer-readable medium.

According to the present invention, a method for providing lungs symmetry information is provided, the method comprising the following steps:
a) providing 2D X-ray image data of a patient's chest;
b) segmenting the image data to provide segmented image data separated from un-segmented areas, the segmented image data comprising a lungs mask image (31) having first and second selected regions corresponding to lung structures;
c) extracting spatial lung volume information from the image data using the segmented image data derived from the image data;
d) determining lungs symmetry information using the extracted spatial lung volume information; and
e) providing the lungs symmetry information to a user, wherein the extracting step c) further comprises:
c1) generating a thorax mask image wherein, for the first and second selected regions, the image data is removed by applying a pixel value representing soft tissue;
c2) subtracting the thorax mask image from the 2D X-ray image data (202) to achieve a lungs-only image comprising the spatial lung volume information, and wherein the determining step d) further comprises:
d1) summing the spatial lung volume information of the first and second selected regions.

Based on an analysis of the original 2D X-ray image data, the present invention advantageously enables the provision of lung symmetry information to a user, typically medical personnel. This information facilitates an objective assessment by a user of the symmetry of a patient's lungs, leading to a more reliable diagnosis by the medical personnel. The lungs symmetry is based on volume or spatial information. This provides improve knowledge going beyond what is visible in the image itself. An assessment of the patient's situation is thus improved.

According to the invention, a thorax mask image is obtained containing grey values corresponding to the soft tissue of the surrounding organ, i.e. a lung. For example, in the thorax mask image the image data in the lungs is replaced by bright artificial soft tissue. This thorax mask image is subtracted from the original image data within the segmented areas corresponding to the lung structures.

Thereby, a particularly reliable estimation of the lung volume can be obtained directly from the X-ray image data. The correlation between a pixel value in the X-ray image data and the volume of the relevant body part at the corresponding point is strengthened, thus providing accurate volume estimations.

According to an example, in step a) the 2D X-ray image data is provided as image data acquired in: a1) a posterior-anterior or in an anterior-posterior direction, or a2) in an oblique direction provided in an angular alignment to the posterior-anterior or anterior-posterior directions, wherein the image data comprises separate image regions of the right and the left lung respectively.

According to a further example, step b) further comprises: b1) identifying left and right lungs of the lungs; or b2) identifying a lateral boundary of the lungs enclosing left and right lungs; and the extraction in step c) is provided based on: c1) the left and the right lung; or c2) the lateral boundary of the lungs.

According to a further example, the method further comprises in step d): d2) applying a conversion factor to the summed spatial lungs volume information to obtain left and right lung volume representations; d3) calculating a total representation of the left and right lung volume representations; and d4) generating the lungs symmetry information using the left and right lung volume representations and the total representation.

According to a further example, the conversion factor is a scale using an inverse of a half value layer (HVL).

For example, the inverse of the image signal that is generated of 1 mm soft tissue in the image, which is represented in the logarithmical domain. This is=1 mm/HVL [mm]. The lung volume data is multiplied with this conversion factor.

According the invention, also a lungs measurement device is provided, comprising an interface unit, a processing unit, and an output unit. The interface unit is configured to provide 2D X-ray image data of a patient's chest. The processing unit is configured to segment the image data to provide segmented image data separated from un-segmented areas, the segmented image data comprising a lungs mask image (31) having first and second selected regions corresponding to lung structures; and to extract spatial lungs volume information from the image data using the segmented image data derived from the image data.

The processing unit is further configured to generate a thorax mask image wherein, for the first and second selected regions, the image data is removed by applying a pixel value representing soft tissue, and to subtract the thorax mask image from the 2D X-ray image data to achieve a lungs-only image comprising the spatial lung volume information, and to sum the spatial lung volume information of the first and second selected regions, The processing unit is further configured to determine lungs symmetry information using the extracted spatial lungs volume information. The output unit is configured to provide the lungs symmetry information to a user.

According to an example, the processing unit is further configured to apply a predetermined adaption to the segmented image data in an area defined by the segmentation, to form a thorax mask image together with the un-segmented areas. The thorax mask image is an image where the image data in the lungs is replaced by values that would be expected if the lung volume was filled not with air but with soft tissue as in the surrounding. The processing unit is further configured to subtract the thorax mask image from the image data to derive the spatial lungs volume information. The thorax mask image is subtracted from the 2D X-ray data provided by the interface unit to achieve a lungs-only image.

According to the invention, also an X-ray imaging arrangement is provided, that comprises an X-ray image acquisition device with an X-ray source and an X-ray detector, and a lungs measurement device according to one of the above-mentioned examples. The X-ray image acquisition device is configured to acquire the image data of a chest of a patient and to provide the image data to an interface of the lungs measurement device.

According to a further example, the X-ray image acquisition device provides exposure settings to the image acquisition device.

The term "lungs symmetry information" defines an objective figure, or figure of merit, which can be calculated using the method described in this application. It is a contribution to quantitative medical imaging. Therefore, the lungs symmetry information, which may also be referred to as a lungs symmetry index, may be automatically derived from the radiograph and objectively presented to the radiologist through the user interface. In other words, the lungs symmetry index is a quantitative measure of the deviation of one lung with respect to another lung. Such a deviation, for example caused by a partial distortion or deformation of the lung, may be caused by fluid accumulation in air spaces of the lungs, or by an inflammation, for example like the inflammation that is present in pneumonia. The determination of the lungs symmetry information represents a measure of non-congruency between a first and second lung of the patient. The determination of the lungs symmetry information may also comprise the determination of imparity or diversity between the first and second lungs. The determination of lungs symmetry information may reflect differences in the volume of one lung relative to another lung.

The term "lung structures" relates to areas within a chest X-ray image, which display lung tissue. Taken as a whole, these areas define a 2D shape on the image, which is representative of lung structures.

The term "spatial lung volume information" defines information about the volume of a lung, which is distributed over the area of a grey scale image or a region of a grey scale image where the volume of a lung at a particular point on the grey scale image is related to the pixel intensity at the same point on the image. Therefore, by summing the pixel intensity of each pixel defined within the area, which is a lung structure, the volume of the lung may be found. Therefore, the pixel information within the area defined by the lung structures is spatial lung volume information. In other words, the integration of the spatial lung volume information over the lung structure area yields the lungs volume.

The term "lateral boundary of the lungs" defines a locus, which, on an X-ray image viewing a chest from the posterior-anterior direction or the anterior-posterior direction, defines on one side an area where lung structures are present, and on the other side an area where lung structures are not present.

The term "thorax mask" defines an image, which results from an intermediate step of an image processing operation. Initially, a 2D X-ray image of a chest cavity will contain information, which originates from the lung structure. However, if this information is removed, then the only information remaining is connected with the thorax of the patient. Such an intermediate thorax image may then be subtracted from the original 2D X-ray image. In this way, the intermediate image has been used as a mask to isolate certain information from the original 2D image.

The term "lungs mask" may also refer to an image used in an intermediate step of an image processing operation. In this case, the lungs mask may define an area of the original 2D X-ray image, in which lungs structures are present. The lungs mask image may then subsequently be used to obtain the thorax mask image by interpolating and applying a pixel value representing soft-tissue, but only within the area of the thorax defined as containing lung tissue by the lungs mask image.

Therefore, according to the above-described embodiments, the symmetry of a patient's two lungs can be quantified, and assessment is not left to the experience of the doctor or radiologist alone. Because diseases like pneumonia or pulmonary oedema deteriorate the symmetry of the lungs, a healing process can be monitored using the lungs symmetry information. Such diseases are very common and patients in the intensive-care unit are examined for changes in lung condition on a daily basis. Providing a quantitative figure as calculated in a manner defined by the claims provides a figure of merit, which allows a medial practitioner such as a doctor or a radiologist to increase the accuracy of their diagnosis.

The patient does not need to be present for the invention to be used, because it is applied to 2D X-ray image data.

The invention relies on the observation that a lung volume may be approximated from a 2D X-ray image of a patient's chest. This is possible because for a respective area of the lungs structure in the X-ray image, the intensity of the image at that area is related to the amount of air present in the lung structure at that area on the image. Therefore, for each respective area over the lung structure, a summation of the pixel intensity values corresponding to that area can allow an approximation of the lungs volume to be found for that area. By repeating this summation for the other lung, and then dividing the two results, an approximation of the lung symmetry can be derived.

These and other aspects of the present invention will be apparent from and elucidated with reference to the embodiments described afterwards.

BRIEF DESCRIPTION OF THE DRAWINGS

Exemplary embodiments of the invention will be described in the following with reference to the following drawings.

DETAILED DESCRIPTION OF EMBODIMENTS

According to the invention a solution is proposed to provide a reproducible objective figure of merit for the purpose of identifying lung conditions. This reduces the need to judge the presence of lung conditions from chest X-rays based solely on the experience of individual doctors or the radiologists. As such, the detectability of lung diseases is improved.

Furthermore, the monitoring of lung diseases in an intensive care unit may be performed daily, or more frequently. Different medical personnel may be responsible for assessing the progression of a lung condition in the same patient on consecutive days. If the assessment is purely subjective on the part of different medical personnel, there is a high risk of error in the assessment of the progression of a condition.

Figure 1:
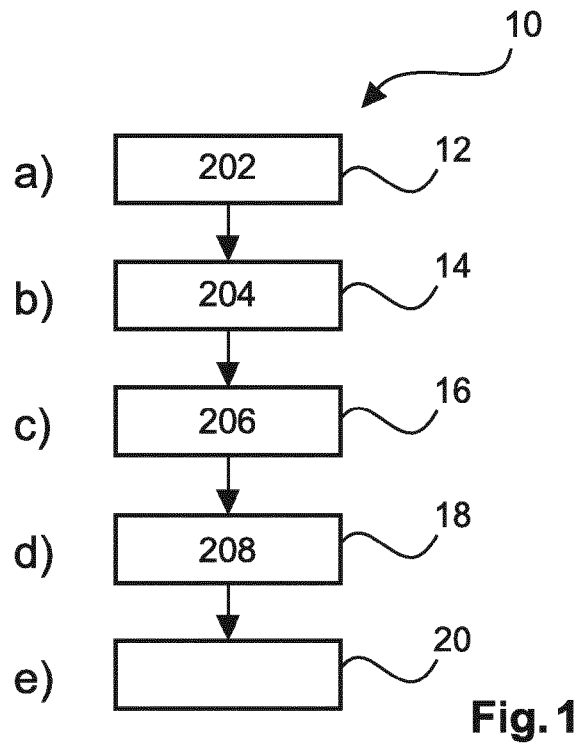
FIG. 1 schematically illustrates basic method steps of a method for providing lungs symmetry information according to an example.

FIG. 1 shows basic steps of a method 10 for providing lungs symmetry information, comprising the following steps: In a first step 12, 2D X-ray image data 202 of a patient's chest is provided. In a second step 14, the image data is segmented to provide segmented image data 204 separated from un-segmented areas. In a third step 16, spatial lung volume information 206 is extracted from the image data using the segmented image data derived from the image data. In a fourth step 18, lungs symmetry information 208 is determined using the extracted spatial lung volume information 206. In a fifth step 20, the lungs symmetry information is provided to a user. In an example, the calculation of the symmetry requires the provided image data to be in a posterior-anterior (pa) or anterior-posterior (ap) direction.

In an example, the provided 2D X-ray image data is image data acquired in a coronal plane of the patient. The term "coronal plane" describes planes from a left side to a right side of the patient. The term "coronal plane" also describes planes in an oblique arrangement to the coronal plane being perpendicular to a front-back direction, i.e. perpendicular to the sagittal plane. The providing step 12 is also referred to as step a), the segmenting step 14 as step b), the extracting step 16 as step c), the determining step 18 as step d), and the determining step 20 as step e). According to the invention, the lungs symmetry information is an objective measure of the non-congruency when comparing the left and right lung of a patient using X-ray.

According to the method described above, knowledge of lung volume information is derived and then used to produce a lungs symmetry information value. It is possible to calculate the lung volume information owing to the observation that the intensity of a pixel value in a specific area of the spatial lung volume information is related to the amount of air contained in an area of the lung correlated with that pixel. Thus, the method allows the automatic calculation of lung symmetry information, and its provision to a user, typically medical or radiological personnel working in a hospital. Therefore, the method can provide a more accurate and objective assessment of lungs symmetry than the existing method, which simply involves "dead reckoning" by the medical personnel. However, it will be appreciated that the invention does not provide a diagnosis and provides no treatment of patients, but simply assists a medical personnel in reaching a diagnosis or treating a patient. The steps of the method previously described do not require interaction with a patient's body or the involvement of medical personnel.

Figure 2:
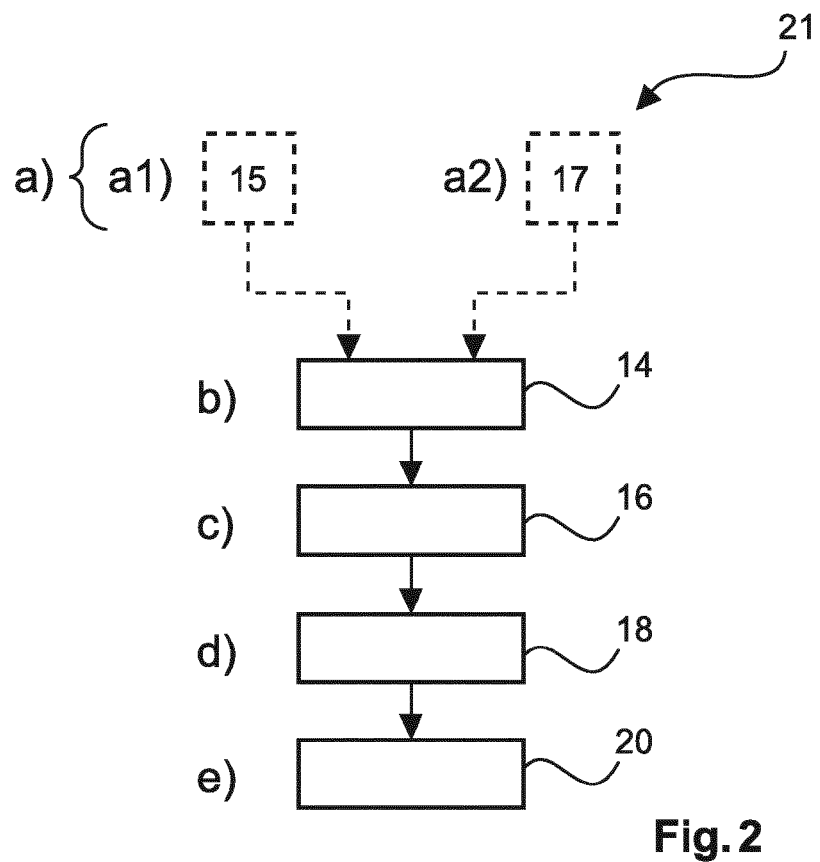
FIG. 2 illustrates a further example of a method.
Figure 3:
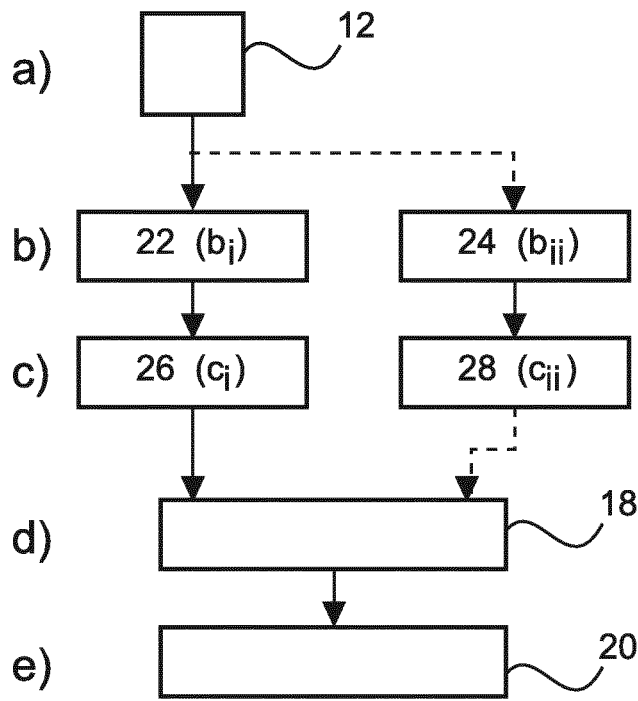
FIG. 3 illustrates a still further example of a method.

According to a further exemplary embodiment, as shown in FIG. 2, in step a), the providing step, the 2D X-ray image data is provided as image data acquired in:

a1) a posterior-anterior or an anterior-posterior direction 15; or a2) in an oblique direction provided in an angular alignment to the posterior-anterior or anterior-posterior direction, wherein the image data comprises separate image regions of the right and the left lung respectively 17.

In the case of step a1), 2D X-ray image data may be easily collected from a patient standing in a vertical orientation or lying down horizontally. In the providing step of a2), which is an alternative, the image data may be collected in an angular alignment, in other words, when the patient is supported on an inclined surface.

According to the method described previously, it is possible to obtain an objective assessment of lungs symmetry even when the patient is standing, lying, or in an oblique direction, for example arranged in a bed with the upper body part slightly lifted. Therefore, patients who are not mobile and for whom access to radiological equipment is more difficult can still benefit from an assessment of lungs symmetry using the method.

It is noted that in an example, the image data 202 may also comprise pixel area information, in other words, the pixel pitch of the detector in mm². The advantage of this is that after segmentation, the area of each lung in mm² can be calculated. The darkness of the lungs is a measure of a transition passage filled with air, so it can be re-mapped to the area of the lung in millimeters squared. Integrating the pixel area over the lung structure leads to a figure, which is closely correlated to the volume of the lungs.

In a further example, tube voltage data may additionally be used as an input. The reader will appreciate that lung volume information may be calculated and used as lungs symmetry information.

In a further example, the 2D X-ray data of a patient's chest may be provided as a 2D projection from 3D CT image data.

In an example, the 2D X-ray data of a patient's chest originates from a 2D X-ray image.

In a further example, the input image data 202 is calibrated so that it is proportional to the logarithm of the X-ray intensity.

The step 20 of providing the lungs symmetry information to a user further comprises outputting any one of the first lung volume representation, the second lung volume representation, or the total lungs volume representation to the user in a still further example.

In an example, the 2D X-ray image data 202 represents the logarithm of the intensity of the radiation. The term "logarithm of intensity" relates to the logarithmic scale of the image data, wherein same number intervals represent logarithmic values. The term relates to the inversion of the law of attenuation, describing the exponential dependence on the thickness of the object being penetrated by the radiation, in this case the patient.

In an example, the calculation of the total lungs volume requires the knowledge of the tube voltage data and the half value layer (HVL). In an example, the lungs symmetry information 208 can be calculated only with knowledge of an HVL value.

In an example, the tube voltage data used as a scaling factor cancels out across the two lungs.

In another exemplary embodiment of the invention, the step of segmenting the image data to identify lung structures to provide segmented image data separated from un-segmented areas further comprises a step $b_i$), of identifying 22 a left and right lungs of the lungs; or a step $b_{ii}$) as identifying 24 a lateral boundary of the lungs enclosing the left and the right lungs. In addition, the extracting step c) is provided based on: $c_i$) the left and the right lung 26; or $c_{ii}$) the lateral boundary of the lungs 28.

Figure 7:
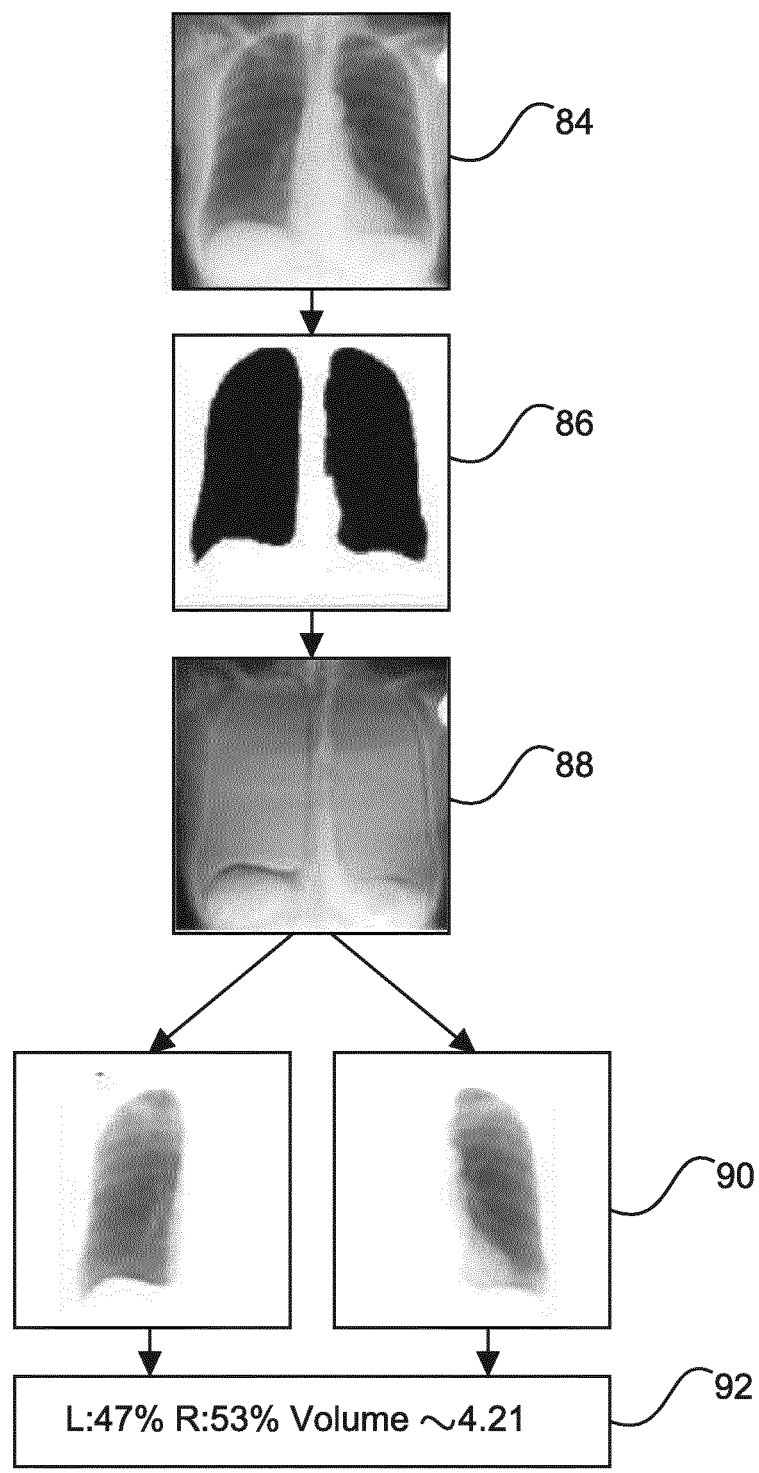
FIG. 7 shows exemplary results of imaging calculations as performed by the method described.

In the first alternative defined by steps $b_i$) and $c_i$), the segmentation step identifies two lungs, as will be seen for example in step 86 of FIG. 7. This illustrates how a 2D image from an X-ray scanner can be segmented so that areas defining lung tissue can be separated from areas not defining lung tissue. In this first option, extraction of the spatial lung volume information from the image data is accurately mapped to the areas of lung tissue.

Figure 11:
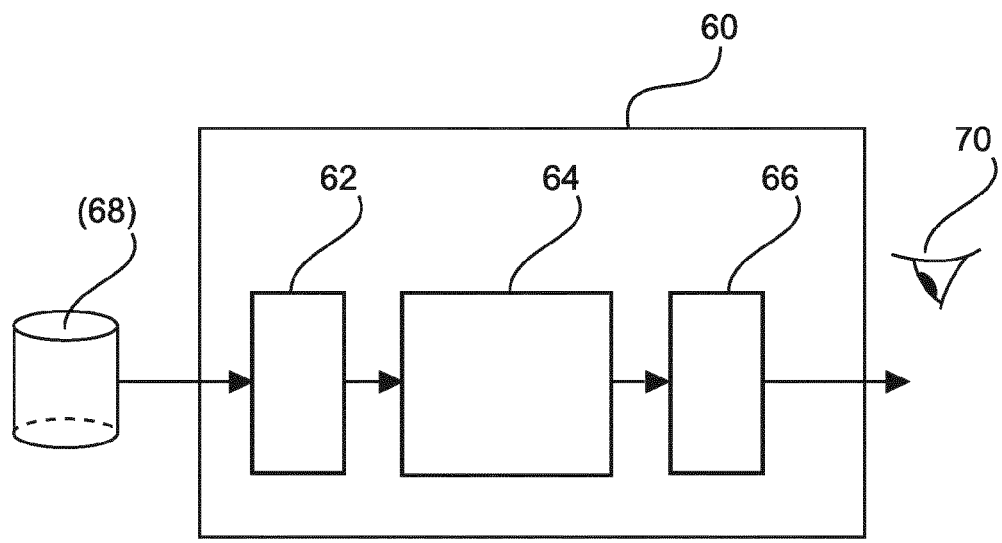
FIG. 11 illustrates a lungs measurement device according to an example.

In the second example, defined by steps $b_{ii}$) and $c_{ii}$), a lateral boundary of the lungs enclosing the left and right lungs is provided. FIG. 11 provides an illustration of the derivation of the lateral boundary of the lungs. It will be appreciated that the natural shape of a typical patient's chest cavity allows the area defining lung tissue to be extracted from the 2D X-ray image data using simple techniques such as spline interpolation. This may, advantageously, result in reduced computational complexity whilst maintaining a good fit when calculating the segmented image data.

Figure 4:
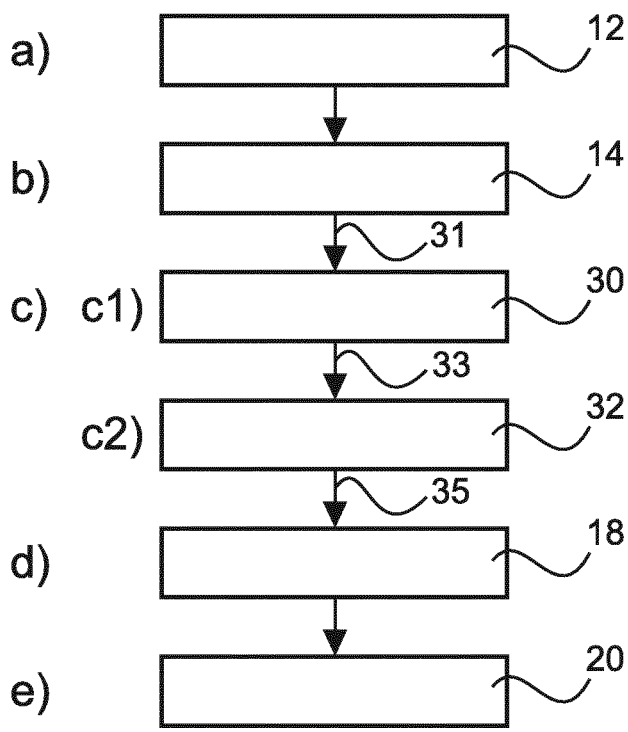
FIG. 4 illustrates a further example of a method.

According to an aspect of the invention, illustrated by FIG. 4, the step of extracting spatial lung volume is further defined. According to this further exemplary embodiment, there is provided a step 30 of segmenting the image data thereby defining a lungs mask image 31 having first and second selected regions corresponding to lung structures, wherein together with the un-segmented areas, a thorax mask image 33 is formed. Further, the thorax mask image is an image where the image data in the lungs is replaced by values that would be expected if the lung volume was filled not with air but with soft tissue as in the surrounding. A definition of the "lungs mask image" and the "thorax mask image" may be found in the summary of the invention. This embodiment further comprises the step of subtracting 32 the thorax mask image from the image data to derive the spatial lungs volume information. The thorax mask image is subtracted from the 2D X-ray data provided in the providing step to achieve a lungs-only image 35.

The thorax mask image is the same as the 2D image data outside the area defined by the lungs mask image 31. Inside the area defined as a lung by the lungs mask image, the lungs (lung data) are removed by applying a pixel value representing soft tissue. In other words, in an example, the thorax mask image is a 2D X-ray image of a patient's chest, whereby the lungs are replaced by a region, which appears as bright artificial soft tissue.

In an example, further, a predetermined adaption may be applied to the lungs mask image 31, which may comprise, for example, a suitable interpolation technique, such as linear interpolation, polynomial interpolation, or spline interpolation. It will be appreciated that the interpolation method is applied in an example around the rim of the area of the 2D X-ray data defining the lung tissue, so as to provide a smooth transition between the thorax mask image and the area, which appears as bright artificial soft tissue.

Therefore, with the inclusion of the previously described step, a thorax mask image may advantageously be derived which may be subtracted from original image data to provide spatial lungs volume information, in which lung volume may be calculated using a relationship between the pixel intensity and the pixel area.

Figure 5:
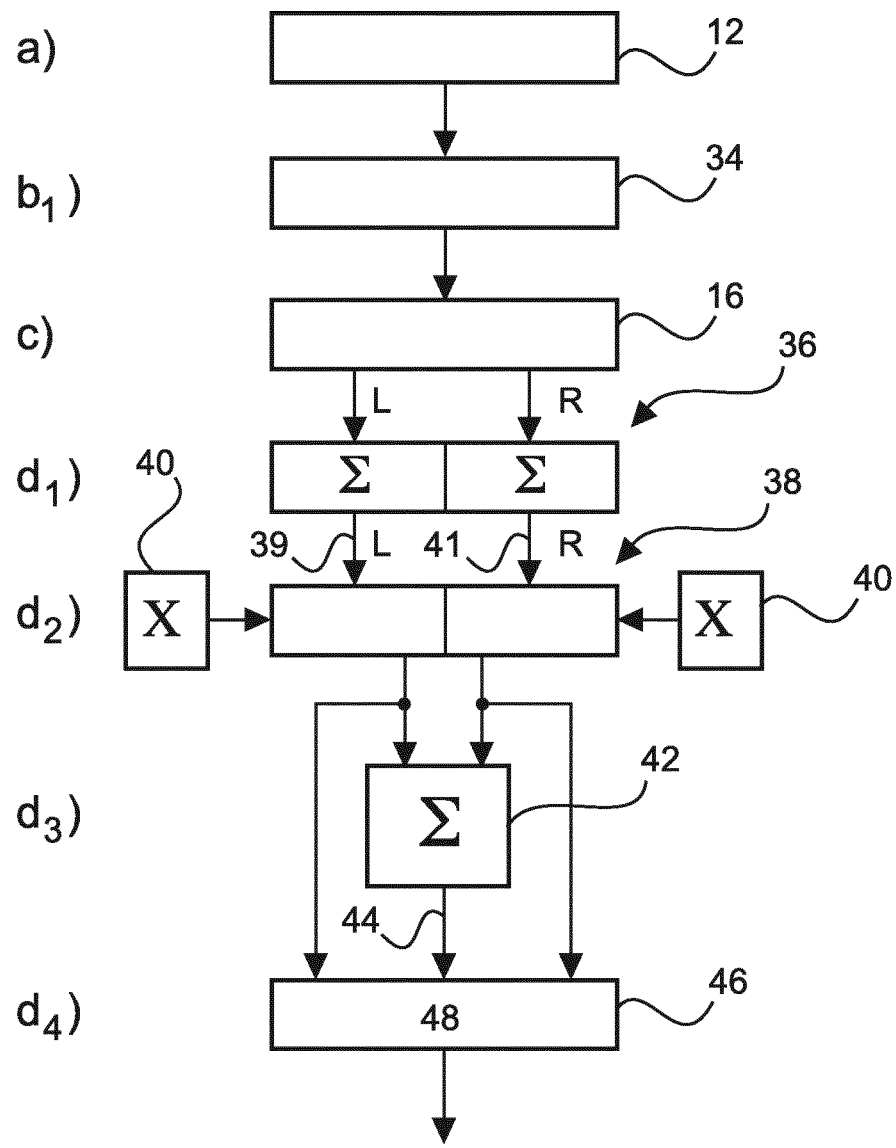
FIG. 5 illustrates a still further example of a method.

According to a further exemplary embodiment, as illustrated in FIG. 5, the step of segmenting the image data to identify lung structures further comprises segmenting 34 the input image data into first and second selected regions of the lungs mask image 31. Furthermore, the step of determining comprises summing 36 spatial lungs volume information of the selected regions, and a step 38 of applying a conversion factor 40 to the summed spatial lungs volume information to obtain left 39 and right 41 lung volume representations, and a calculating step 42 wherein a total representation 44 of the left and right lung volume representations is calculated, and a generating step 46, wherein the lungs symmetry information 48 is generated using the left and right lung volume representations and the total representation.

In other words, once the spatial lungs volume information of the selected regions has been derived, all of the data in the information is added up, for each lung separately.

In the example, the application 38 of the conversion factor 40 to the summed spatial lungs volume information is necessary because the information contained in the 2D X-ray input image is proportional to the logarithm of the intensity of the X-ray at the detector. The sum of all pixel values in the "spatial lungs volume information" is proportional to the volume of the lungs volume. The phenomenon of "beam hardening", and the fact that the absorption properties of the real soft tissues involved is not exactly the same, means that the correlation of this pseudo-volume to the true lung volume will be limited. However, in the calculation of the lungs symmetry index, these factors cancel each other out. This is the case, because the calculation of the lungs symmetry information requires the division of left and right lung data. Therefore, the quotient is well-correlated to the visual impression of symmetry, which has had no objective figure until now.

It will be appreciated by the reader that the lung volumes calculated are representations of the lung volume and may vary slightly compared to the genuine volume of the lungs, owing to phenomena such as X-ray reader resolution, natural patient lung variation, and the like.

In this embodiment, further method steps have been described, which advantageously allow the calculation of volume representations of a patient's lungs and accordingly, lungs symmetry information.

In an example, the summed spatial lungs volume information is the integral of an area of the lungs (derived from the pixel area data) and the intensity of each pixel value.

For example, the total representation of the left and right lung volume representations may alternatively be calculated using oblique views of the chest.

In an example, the application of the conversion factor to the image data may be performed at any step prior to step 38. The conversion factor may not be applied to the image data after step 38.

In an example, the predetermined adaptation is an interpolation.

For example, the predetermined adaptation is a spline interpolation over three supporting points per image row. These are a grey value at the left lung border, a grey value at the body centre (defined by a symmetry axis or a spline), and a grey value at the right lung border.

In a further example, the grey values may be smoothed, in a manner, which does not affect the mean value of the image.

In a further example, any suitable interpolation method may be used for the interpolation, such as a simple constant, a linear interpolation, a polynomial interpolation, or a spline interpolation.

It will be appreciated by the reader that the natural shape of the chest cavity, which forms a flattened arch-shape, as illustrated in FIG. 11, may be best reconstructed using a spline.

In a further example, the grey values may be smoothed by averaging in a vertical direction.

In an example, smoothing does not alter the mean value of the intensity. Hence, the computed outcome of the method is not influenced. However, it produces more plausible visual results.

For example, the spatial lungs volume information ($L_{right}$ and $L_{left}$) results from the subtraction of the thorax mask image from the image data.

Figure 6:
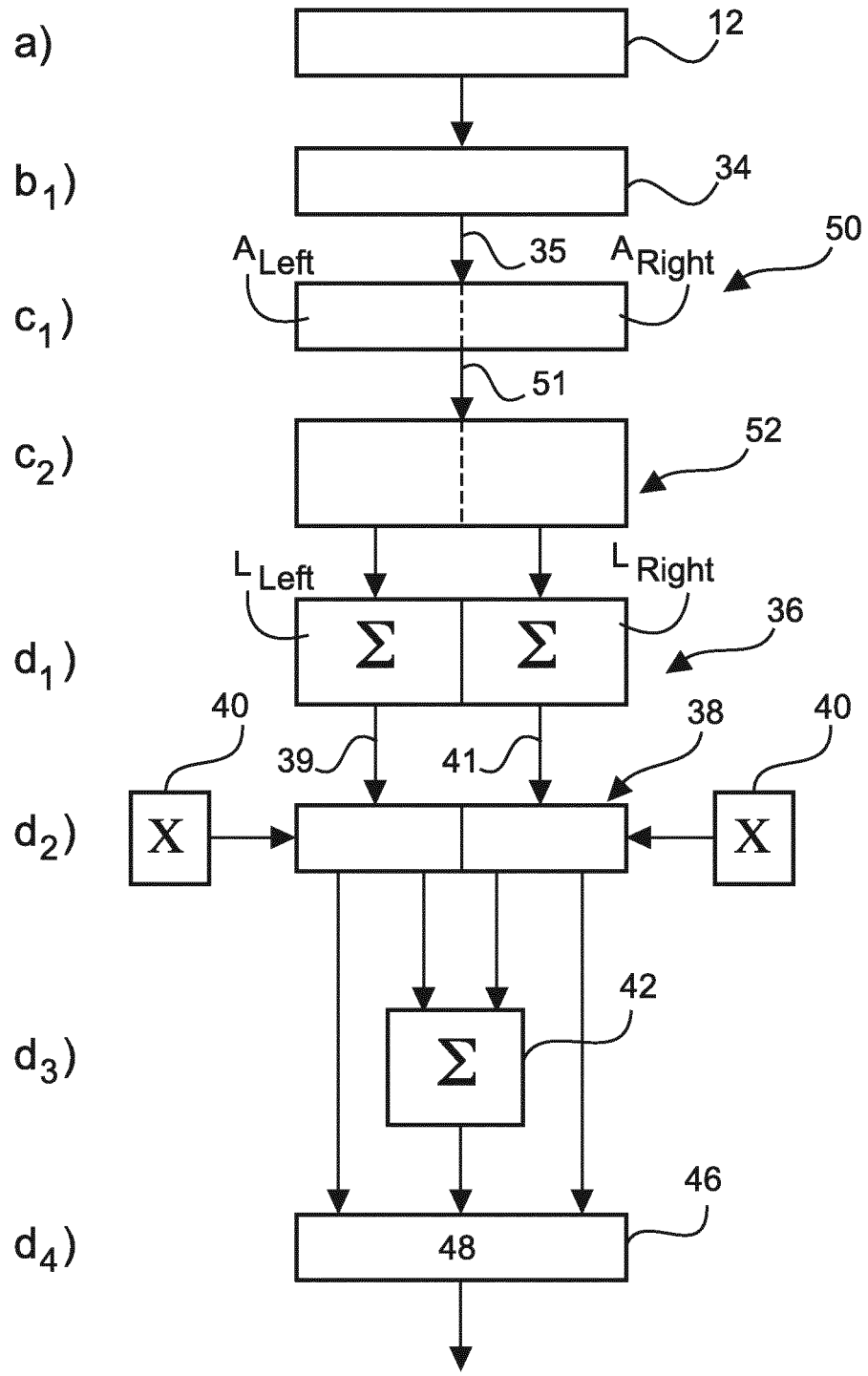
FIG. 6 illustrates a further example of a method.

According to a further exemplary embodiment, illustrated in FIG. 6, the extracting step 16 further comprises a step 50 of interpolating over the image data corresponding to the first and second selected regions of the lungs mask image 31 to remove lungs information, producing a first area ($A_{right}$) and a second area ($A_{left}$) of the thorax. The first and second areas are located within a thorax mask image 51. In this embodiment, the extracting step also further comprises a step of subtracting 52 the thorax mask image from the image data to produce first spatial lung volume data ($L_{right}$) and second spatial lung volume data ($L_{left}$).

Therefore, the spatial lung volume data can be isolated from the input 2D X-ray image. By integrating the pixel intensity and the area of the lung tissue in the input image, a representation of the lung volume may be calculated for use in a lungs symmetry index. In practice, the integration may correspond simply to the summation of the pixel values within the first or second lung volume data.

For example, in the interpolating step 50, the thorax area is identical to the image data outside the interpolated areas.

In an example, the first and second areas are located within the outer boundary of the thorax mask image.

For example, the region appearing as bright artificial soft tissue has a uniform brightness value apart from the interpolated areas. As previously described, the interpolated areas comprise an area for example, a few centimeters wide, close to the rim of the lung area.

For example, only a few centimeters close to the rim of the area of the first and second area are relevant to the interpolation, to provide a smooth transition between the thorax and the removed lung area.

In an example, it is provided that the summing step 36 comprises summing the pixel values of the first spatial lung volume data and the second spatial lung volume data. The applying step 38 comprises applying a conversion factor to each of the first and second spatial lung volume data to obtain individual lung volume representations. The calculating step 42 comprises calculating a representation of the total lungs volume by summing the first and second lung volume representations. The generating step 46 comprises generating a first ($p_{right}$) fraction from the individual lung volume representations.

In a further example, in addition to the first fraction, also a second ($p_{left}$) fraction from the individual lung volume representations is generated.

In an example, the individual lung volume representations are generated by adding all pixel values of $L_{right}$ and $L_{left}$, respectively.

In an example, the step 46 comprises generating at least one fraction from the individual lungs volume representations, and subtracting the at least one fraction from 1 to obtain the other value.

In other words, given a lung volume $v_{left}$ and $v_{right}$, the total volume may be calculated as:

$$v_{total} = v_{left} + v_{right}$$

The fraction for each lung may be calculated accordingly:

$$p_{left} = v_{left}/(v_{left} + v_{right})$$

$$p_{right} = v_{right}/(v_{left} + v_{right})$$

It will be appreciated that the lungs symmetry index may be presented to the user according to step 20 in a number of different ways. For example, the figure $p_{left}$ and $p_{right}$ may be output as ratio. Alternatively, a percentage of the left lung or the right lung of the total lungs volume area may be displayed. Alternatively, the raw volumes calculated as $v_{left}$ and $v_{right}$ may be presented directly to the user. It will be appreciated that the user could determine the lungs symmetry using the individual lung volumes as calculated from the spatial lung volume data.

According to an exemplary embodiment, the conversion factor applied for example at step 38 in FIG. 6, is a scale using an inverse of a half value layer (HVL), of incident X-radiation in human soft tissue. For example, the inverse of the image signal that is generated of 1 mm soft tissue in the image, which is represented in the logarithmical domain. This is=1 mm/HVL [mm]. The lung volume data is multiplied with this conversion factor. Therefore, a half value layer of X-radiation in human soft tissue for the X-ray spectrum used can be used as a conversion factor to calculate the pseudo-volume of the lungs.

In other words, the following expression defines a relationship for calculating the pseudo-volume of the lungs:

$$V \sim ((A * \Delta \log)/\text{HVL}_{softtissue})$$

where V is the pseudovolume, A is the lung area, $\Delta$ is the pixel intensity, and $\text{HLV}_{softtissue}$ is the Half Value Layer of X-rays in human soft tissue.

Advantageously, the half value layer may be adjusted dependent on the specific X-ray wavelength used, to ensure that the pseudo-volume of the lungs is as accurate as possible.

In a further example, the following steps are provided:

providing anterior-posterior or posterior-anterior image data as unprocessed image data and mapped into the log-domain;

segmenting the two areas of the left and right image and identifying right and left lungs correctly according to anterior-posterior or posterior-anterior orientation;

calculating the thorax-mask by interpolation, wherein for the mask the image parts outside the areas of the left and right lungs are identified;

subtracting the thorax-mask from the image date for determining lung-volume-data ($L_{right}$ and $L_{right}$);

applying a conversion factor based on half value layer (HVL);

calculating the volume figure out of the lungs volume data by integration or by adding all pixel values of ($L_{right}$ and $L_{right}$), wherein a further sub-step of calculating total volume based on the voltage value in kilovolts (kV) is applied for the image acquisition and based on the HVL, and/or a sub-step of calculating symmetry figures.

It will be appreciated that in the first example, the symmetry figures can be calculated without the applied voltage data. This is because the scaling factor on the numerator and denominator of the lungs symmetry index cancels out in the division. The scaling factors are identical for the right and the left lung, provided the X-ray source is an identical distance from either lung.

Alternatively, to calculate the total volume directly, knowledge of the applied tube voltage in kilovolts and the half value layer (HVL) of the X-radiation at the relevant frequency in human soft tissue must be used.

A schematic representation of the data present throughout the processing steps of the embodiments described previously may be seen in FIG. 7. In a first step 84, 2D X-ray image data of a patient's chest is input. The reader will note an asymmetry on the side of the patient's left lung closest to the central image axis. This image represents the data present at step a), the providing step 12 of the method. A frame 86 illustrates the lungs mask image formed after the step of segmenting the input image data. The segmenting occurs at step 14 of the previously described method step. It will be appreciated that the segmentation in this segmentation method has identified the left and right lungs. The alternative identification of the lungs using the lateral boundary of the lungs is not illustrated. Then, the lungs mask image is used to define an area, or areas, within which a predetermined adaptation is applied to the original 2D X-ray image data. This step, which is equivalent to an image frame 88 that is representing the data present in step c), produces the thorax mask image. The thorax mask image shows the anatomy structure as in the X-ray image, but with "erased" values for the lungs. The lungs are so-to-speak replaced by grey values. The reader will see that the thorax mask image is equivalent to the original 2D X-ray data outside the area defined by the lungs mask image. Inside the area defined by the lungs mask image a solid area of light intensity, corresponding to lung tissue is formed. Additionally, the reader will note that the boundary between the original 2D X-ray image data and the area representing the soft tissue is interpolated around the rim. The left and right images at step 90 in FIG. 7 show, respectively, the left and the right spatial lungs volume information of the regions defined originally by the lungs mask image. There is a direct correlation between the area and intensity of the pixels in these images and the volume of the respective lungs. Therefore, by integrating the area of these spatial lungs volume information and the pixel intensity for each of the left and the right lungs, lungs symmetry information or total lung volumes may be calculated and provided in a further step 92, as indicated.

Figure 8:
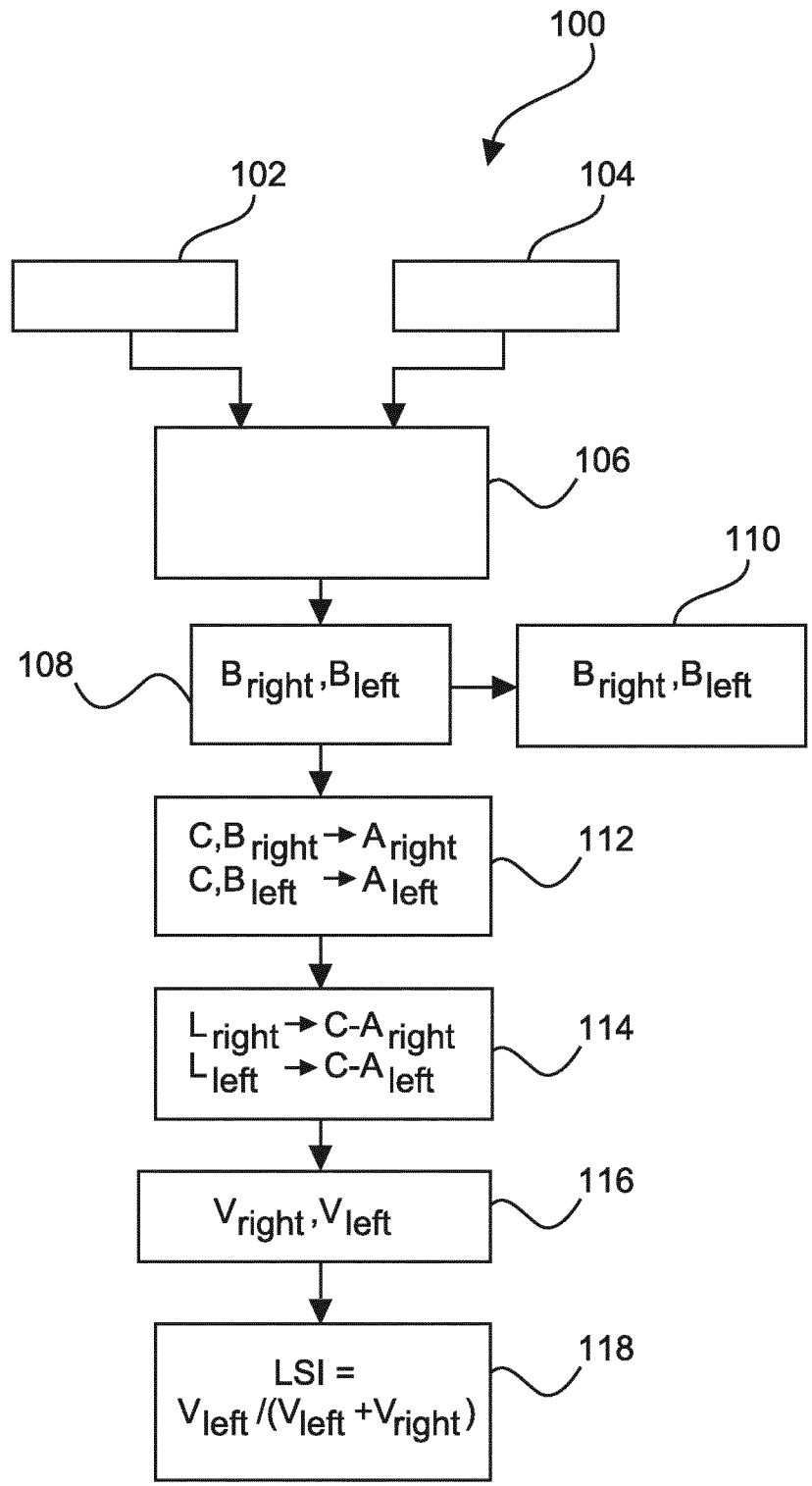
FIG. 8 further illustrates a method for calculating lungs symmetry information.

FIG. 8 is another illustration of a detailed implementation of an example 100 of the method. In a first step, information 102 of an X-ray system and information 104 from a patient are provided. Next, a chest X-ray image in pa or ap is acquired 106 with exposure settings resulting in chest image C. Then, a segmentation 108 is performed identifying a first (e.g. right) bitmap $B_{right}$ and a second (e.g. left) bitmap $B_{left}$. In a further step 110, the bitmaps may be provided showing the lungs in the bitmaps. Further, the lungs are eliminated 112, resulting in an area $A_{right}$ and an area $A_{left}$. After that the lungs are separated 114, and the lung volume is calculated 116. Finally, a lung symmetry index LSI is calculated 118.

Figure 9:
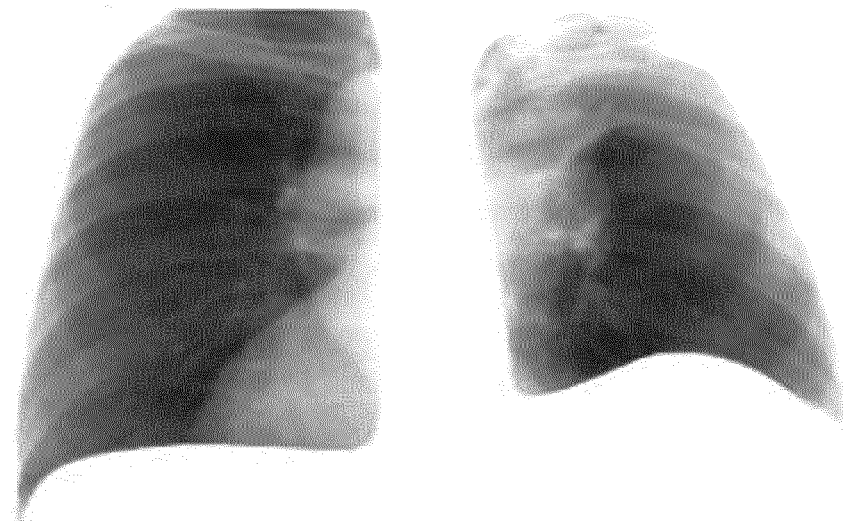
FIG. 9 is an example of a segmented lung image displaying poor symmetry.

FIG. 9 is an example of a segmented lung image displaying poor symmetry. An exemplary output of the algorithm is shown in terms of volume and lung percentages. Comparing the exemplary lungs symmetry index with the test image, it can be seen that the lungs symmetry index provides a good measure of lungs asymmetry. Therefore, the algorithm may advantageously be applied to many different lung images to provide an objective measure of lungs symmetry.

Figure 10:
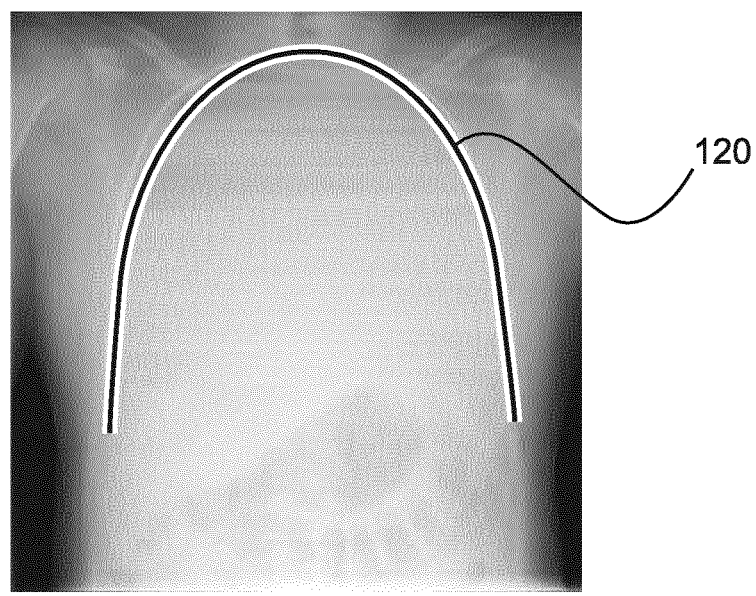
FIG. 10 shows segmented lung areas for a range of lungs symmetry indices.

FIG. 10 illustrates an identification of a lateral boundary 120 of the lungs enclosing left and right lungs. In other words, this image shows the derivation of the lungs structures using a spline to define a lateral boundary between the lung and the chest cavity.

FIG. 11 illustrates a lungs measurement device 60 according to an exemplary embodiment of the invention, comprising an interface unit 62, a processing unit 64, and an output unit 66. The interface unit receives input data, which is 2D X-ray image data 68, and a user 70 observes the output unit 66. Therefore, the processing unit 64 is configured to segment the image data to identify lungs structures to provide segmented image data separated from un-segmented areas, and to extract spatial lungs volume information from the image data using the segmented image data derived from the image data, and to determine lungs symmetry information using the extracted spatial lungs volume information. The output unit 66 provides the lungs symmetry information to the user 70. According to an example, the output unit 66 is a display configured to display the lungs symmetry information directly to the user 70.

In a further example, the output unit is configured to generate a DICOM element to transfer the information. It will be appreciated by a skilled reader that DICOM stands for Digital Imaging and Communications in Medicine and is a standard or a protocol for handling, storing, printing and transmitting information in medical imaging.
In a further example, the output information is formulated as a bitmap overlay according to the DICOM standard.

According to a further exemplary embodiment, the processing unit 64 of the lungs measurement device 60 may be further configured to apply a predetermined adaption to the segmented image data in an area defined by the segmentation, to form a thorax mask image together with the unsegmented areas. The thorax mask image is an image where the image data in the lungs is replaced by values that would be expected if the lung volume was filled not with air but with soft tissue as in the surrounding. The processing unit is further configured to subtract the thorax mask image from the image data to derive the spatial lungs volume information. The thorax mask image is subtracted from the 2D X-ray data provided to achieve a lungs-only image.

According to a further exemplary embodiment, the device 60 contains a processing unit 64, further configured to segment the input image data into first and second selected regions, and to sum the spatial lungs volume information of the selected regions, and to apply a conversion factor to the summed spatial lungs volume information to obtain left and right lung volume representations, and to calculate a total representation of the left and right lung volume representations, and to generate the lungs symmetry information by the use of the left and right lung volume representations and the total representation.

According to a further exemplary embodiment of the lungs measurement device 60, the processing unit 64 is further configured to interpolate over the image data corresponding to the first and second selected regions to remove lungs information, to produce a first area ($A_{right}$) and a second area ($A_{left}$) of the thorax, wherein the first and second areas are located within the thorax mask image, and to subtract the thorax mask image from the image data to produce first spatial lung volume data ($L_{right}$) and second spatial lung volume data ($L_{left}$).

It will be appreciated by the reader that the processing unit 64 may be any processing device capable of performing the processing steps outlined above. The processing unit could comprise, but is not limited to, a microprocessor, an embedded computer, a personal computer, a field programmable gate array, a digital signal processor, or an application specific integrated circuit.

Figure 12:
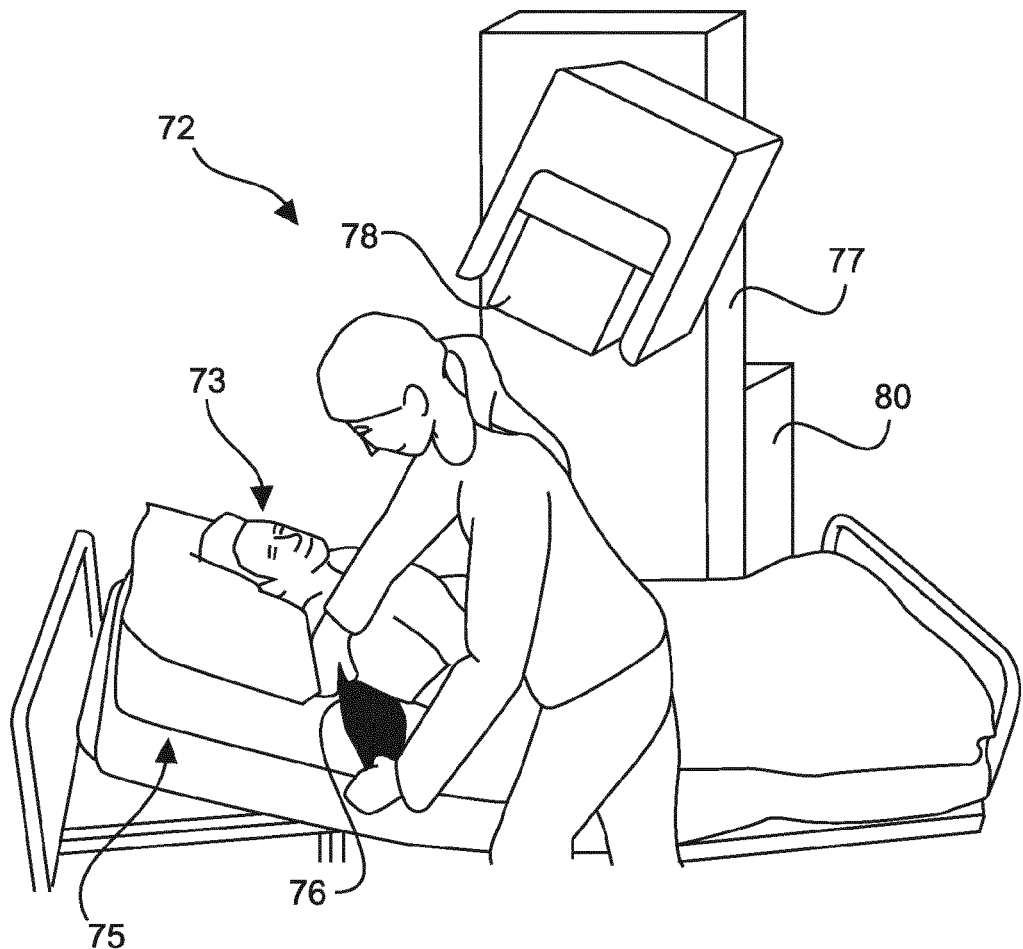
FIG. 12 illustrates an X-ray imaging arrangement according to an example in relation with a patient and a staff member.

FIG. 12 illustrates an X-ray imaging arrangement 72 according to an exemplary embodiment of the invention, comprising an X-ray image acquisition device 74 with an X-ray source 76 and an X-ray detector 78. The X-ray image arrangement also comprises a lungs measurement device 80 according to one of the devices described before. The X-ray image acquisition device 74 is configured to acquire the image data of a chest of a patient and to provide the image data to an interface of the lungs measurement device. For example, the X-ray image acquisition device 74 is a movable system with the X-ray source mounted on a support 77 a portable detector that can be arranged below a patient 73 arranged lying on a bed 75 with a lifted support portion. For the X-ray image acquisition device 74, also other X-ray systems are provided, such as fixedly mounted systems or systems with source and detector mounted to movable portions, such as robotic arms.

In an example, the X-ray image acquisition device provides pixel area information to the lungs measurement device.

In a further example, the X-ray imaging arrangement is used for lungs screening.

In a further example, the X-ray imaging arrangement is used in an intensive-care context to image lungs of patients on a daily basis to identify changes in the lungs at the early stage of a disease. The use of such X-ray image arrangement can improve the quality of such lung monitoring on a daily basis. Different staff members may be available on different days, and might assess lungs symmetry differently. With the provision of an X-ray image arrangement using the lungs measurement device previously described, it is possible for different staff to receive the same objective measurement, and therefore to track the development of a disease pathology more easily. However, it is emphasized that such X-ray image arrangement does not diagnose a disease, and simply provides a new objective measure that may assist a physician in reaching a diagnosis or treating a patient.

According to a further embodiment, the X-ray imaging system 74 as shown in FIG. 12 may comprise an X-ray image acquisition device 78 that provides exposure settings 82 to the image acquisition device.

According to an embodiment (not further shown), the X-ray imaging system 74 as shown in FIG. 12 comprises a display device, or monitor arrangement, to display the above described lungs symmetry information.

In another exemplary embodiment of the present invention, a computer program or a computer program element is provided that is characterized by being adapted to execute the method steps of the method according to one of the preceding embodiments on an appropriate system.

The computer program element might therefore be stored on a computing unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of the data processor. The data processor may thus be equipped to carry out the method of the invention.

This exemplary embodiment of the invention covers both, a computer program that from the beginning uses the invention, and a computer program that by means of an update turns an existing program into a program that uses the invention.

Subsequently, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it, which computer program element is described by the preceding section.

A computer program may be stored and/or distributed on a suitable medium, such as an optical storage medium or a solid-state medium supplied together with or as part of other hardware, but may also be distributed in other forms, such as via the Internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject-matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject-matter also any combination between features relating to different subject-matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for providing lungs symmetry information, comprising the following steps:
    a) providing 2D X-ray image data of a patient's chest;
    b) segmenting the image data to provide segmented image data separated from un-segmented areas, the segmented image data comprising a lungs mask image having first and second selected regions corresponding to lung structures;
    c) extracting spatial lung volume information from the image data using the segmented image data derived from the image data;
    d) determining lungs symmetry information using the extracted spatial lung volume information; and
    e) providing the lungs symmetry information to a user, wherein the extracting step c) further comprises:
    c1) generating a thorax mask image wherein, for the first and second selected regions, the image data is replaced by applying a pixel value representing soft tissue;
    c2) subtracting the thorax mask image from the 2D X-ray image data to achieve a lungs-only image comprising the spatial lung volume information, and
    wherein the determining step d) further comprises:
    d1) summing the spatial lung volume information of the first and second selected regions.

2. Method according to claim 1, wherein in step a) the 2D X-ray image data is provided as image data acquired in:
    a1) a posterior-anterior or an anterior-posterior direction; or
    a2) in an oblique direction provided in an angular alignment to the posterior-anterior or anterior-posterior direction, wherein the image data comprises separate image regions of the right and the left lung respectively.

3. Method according to claim 1, wherein the step b) further comprises:
    $b_i$) identifying left and right lung of the lungs; or
    $b_{ii}$) identifying a lateral boundary of the lungs enclosing the left and right lungs; and
    wherein the extraction in step c) is provided based on:
    $c_i$) the left and the right lung; or
    $c_{ii}$) the lateral boundary of the lungs.

4. Method according to claim 1, wherein
    step d) further comprises:
    d2) applying a conversion factor to the summed spatial lungs volume information to obtain left and right lung volume representations;
    d3) calculating a total representation of the left and right lung volume representations; and
    d4) generating the lungs symmetry information using the left and right lung volume representations and the total representation.

5. Method according to claim 1, wherein:
    step c1) further comprises the step of interpolating over the image data corresponding to the first and second selected regions of the lungs mask image to remove lungs information, producing a first area ($A_{right}$) and a second area ($A_{left}$) of the thorax, wherein the first and second areas are located within the thorax mask image; and
    step c2) further comprises the step of subtracting the thorax mask image from the image data to produce first spatial lung volume data ($L_{right}$) and second spatial lung volume data ($L_{left}$).

6. Method according to claim 1, wherein the conversion factor is a scale using an inverse of a half value layer.

7. A lungs measurement device, comprising:
    an interface unit;
    a processing unit; and
    an output unit;
    wherein the interface unit is configured to provide 2D X-ray image data of a patient's chest;
    wherein the processing unit is configured to segment the image data to provide segmented image data separated from un-segmented areas, the segmented image data comprising a lungs mask image having first and second selected regions corresponding to lung structures; and to extract spatial lungs volume information from the image data using the segmented image data derived from the image data; and to determine lungs symmetry information using the extracted spatial lungs volume information,
    wherein the processing unit is further configured to generate a thorax mask image wherein, for the first and second selected regions, the image data is removed by applying a pixel value representing soft tissue, and to subtract the thorax mask image from the 2D X-ray image data to achieve a lungs-only image comprising the spatial lung volume information, and to sum the spatial lung volume information of the first and second selected regions,
    wherein the output unit is configured to provide the lungs symmetry information to a user.

8. Device according to claim 7, wherein the processing unit is further configured to apply a conversion factor to the summed spatial lungs volume information to obtain left and right lung volume representations; and to calculate a total representation of the left and right lung volume representations; and to generate the lungs symmetry information by the use of the left and right lung volume representations and the total representation.

9. Device according to claim 7, wherein the processing unit is further configured to interpolate over the image data corresponding to the first and second selected regions to remove lungs information, to produce a first area ($A_{right}$) and a second area ($A_{left}$) of the thorax, wherein the first and second areas are located within the thorax mask image; and to subtract the thorax mask image from the image data to produce first spatial lung volume data ($L_{right}$) and second spatial lung volume data ($L_{left}$).

10. An X-ray imaging arrangement, comprising:
an X-ray image acquisition device with an X-ray source and an X-ray detector; and
a lungs measurement device according to claim 7;
wherein the X-ray image acquisition device is configured to acquire the image data of the chest of a patient and to provide the image data to an interface of the lungs measurement device.

11. A non-transitory computer-readable storage medium storing a computer program comprising instructions for controlling an X-ray imaging arrangement the X-ray imaging arrangement comprising:
an X-ray image acquisition device with an X-ray source and an X-ray detector; and
a lungs measurement device according to claim 7;
wherein the X-ray image acquisition device is configured to acquire the image data of the chest of a patient and to provide the image data to an interface of the lungs measurement device;
which, when being executed by the processing unit, is adapted to perform the method steps of
a) providing 2D X-ray image data of a patient's chest;
b) segmenting the image data to provide segmented image data separated from un-segmented areas, the segmented image data comprising a lungs mask image having first and second selected regions corresponding to lung structures;
c) extracting spatial lung volume information from the image data using the segmented image data derived from the image data;
d) determining lungs symmetry information using the extracted spatial lung volume information; and
e) providing the lungs symmetry information to a user,
wherein the extracting step c) further comprises:
c1) generating a thorax mask image wherein, for the first and second selected regions, the image data is replaced by applying a pixel value representing soft tissue;
c2) subtracting the thorax mask image from the 2D X-ray image data to achieve a lungs only image comprising the spatial lung volume information, and
wherein the determining step d) further comprises:
d1) summing the spatial lung volume information of the first and second selected regions.

* * * * *